United States Patent Office 3,356,226
Patented Dec. 5, 1967

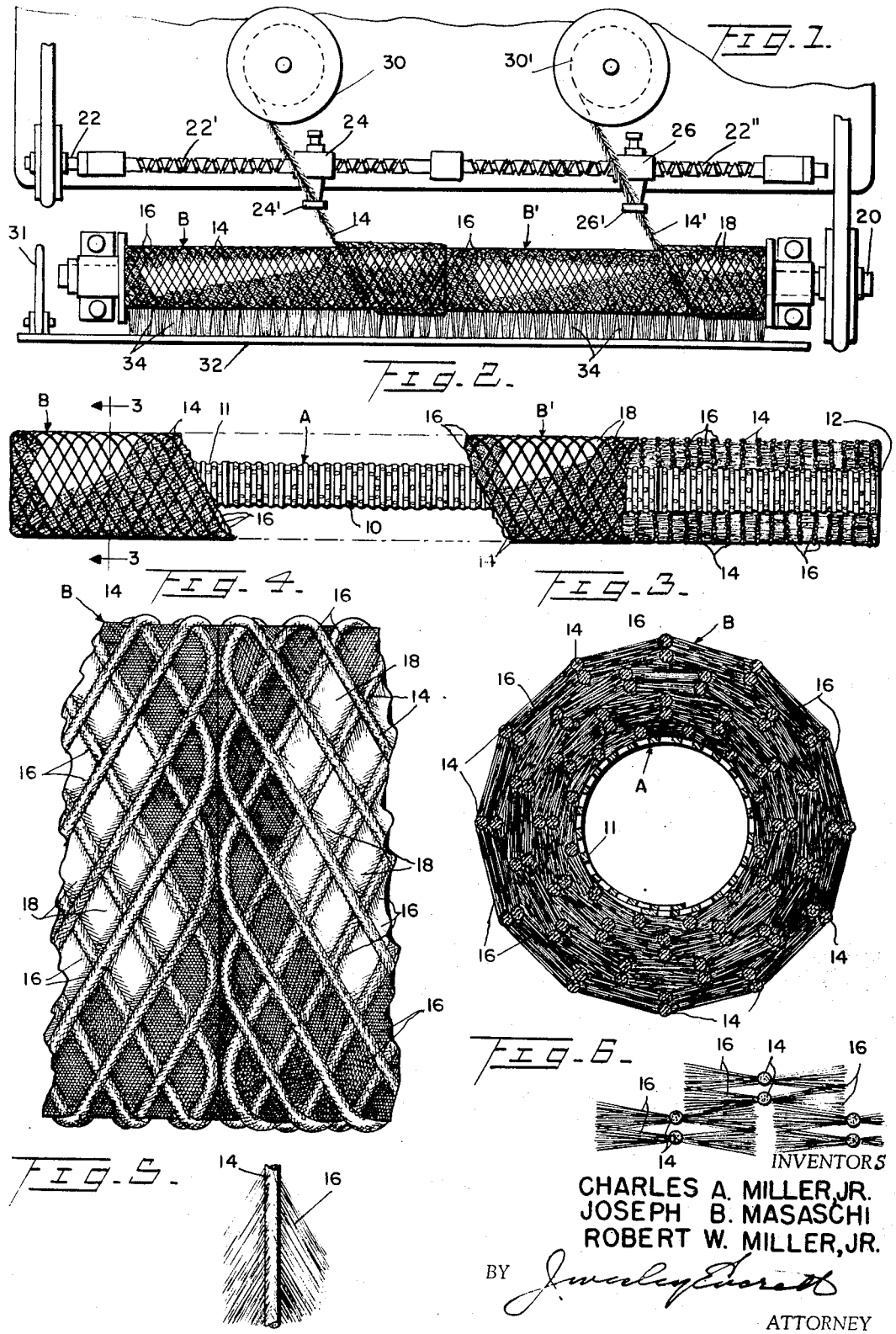

3,356,226
INTEGRALLY WOUND FILTER TUBE
Charles A. Miller, Jr., 4302 N. Charles St., Baltimore, Md. 21218, Joseph B. Masaschi, 112 Shetland Hills Drive, Lutherville, Md. 21093, and Robert W. Miller, Jr., 1219 Wine Spring Lane, Towson, Md. 21204
Filed Dec. 29, 1964, Ser. No. 421,952
1 Claim. (Cl. 210—457)

The present invention relates to fluid filter and in particular to a type of filter known in the trade as wound tube filters.

In this type of filter, the filter generally takes a cylindrical form; however, the form may be modified such as that of a cone, etc., and are usually constructed by winding a fiber cord, or strand upon a rigid perforated core number.

As the use for high capacity filters is always on the increase, it becomes desirable to produce this wound tube type filter more economically and still retain their efficient operation.

The primary object of the present invention is to provide a high capacity filter and a method of constructing such a filter.

Another object of the invention is to provide a sectional wound elongated filter unit wherein, the ends of the sections are so integrated that there is no break in the filtering operations between the sections.

Another object of the invention is to provide for the use of certain parts used in the manufacture of shorter length filters, and for use of machines used in winding shorter filters.

Other objects, uses and advantages will appear as the nature of the invention is more fully disclosed. The preferred form of the invention is illustrated and described in detail in the following specification.

In the drawings:

FIGURE 1 is a view showing certain parts diagrammatical of a winding machine and a sectional filter element in the process of being wound.

FIGURE 2 is a view partly in section and partly in elevation having a portion of the filter unit windings removed to show the perforated core upon which the filter cord, or strand is wound.

FIGURE 3 is an enlarged sectional view taken on line 3—3 of FIGURE 2.

FIGURE 4 is an enlarged fragmentary view in elevation of the fully wound filter tube unit showing the adjoining integrated ends of two tube elements.

FIGURE 5 is an enlarged fragmentary view in elevation of a single cord, or strand illustrating fibers extending outwardly from the surface of the cord, or strand, which are the filtering medium and are also used to unite the abutted ends of the short individually wound filter tubes.

FIGURE 6 is a digrammatical sectional view of the cord, or strand, showing the diverging fibers extending outwardly from the cords, or strand.

In referring to the drawings, like reference numerals are used to designate like and similar parts throughout the several views. The term strand may be used for convenience to designate the filter wrapping, throughout the remainder of the description. The elongated multiple wound unit is referred to in particular as a filter unit, and the sections making up the filter unit are referred to as filter elements.

The strands 14, from which the filter elements and units are wound are preferably of fiber, either natural or artificial, and are either provided in the beginning with long surface fibers 16, or the strand is of such construction that the surface fibers may be lifted from the surface of the strand. These fibers 16 have one end attached to the strand and the other end extended outwardly and is sometimes referred to as the free end. These extended fibers 16 are the heart of the filtering operation of the filter. They are cross-woven between the spaced wound strands and provide the millions of elements upon which the material to be retained by the filter is trapped, or naturally adhere to.

The present elongated filter unit is provided with a perforated tubular core A and individually wound short filter section elements B and B', having two of their ends in abutted relationship.

The core is rigid within the area of the abutment of the two ends of the wound tubes, even though the core may be in several pieces, as shown in FIGURE 2 at 10, 11 and 12, the ends of any length of rigid core pieces coming at a substantial distance from the abutted area of the two tubes elements. The strands 14 and 14' carrying the surface fibers 16 are wound about the core making up the filtering medium, as shown and described in our now pending application for letters Patent, Ser. No. 350,757, dated Mar. 10, 1964, now abandoned, entitled "Filters." In the present invention, not only do the fibers 16 extend between the openings 18 between the wrappings of the strands, but extend outwardly beyond the ends of the wound tube elements B and B', and are of such length that they are engaged and held in position by the windings on the opposite, or companion tube element, that is, the fibers 16 of tube B are engaged and held down by the windings adjacent the ends of tube B', and vice versa on each course of the windings of each of the two units. In this method of winding, the fibers 16 adjacent the ends of all the layers of the winding are interlocked with each other to form a single filtering unit. The fibers 16 extending between the abutted ends of the two separate tube elements are of substantially the same density as they are throughout the remainder of the separate filter elements and, therefore, there is no space between the abutted ends for allowing the fluids, being filtered, to escape through the elongated filter unit without a filtering action.

In manufacturing the multi-section filter tubes, which may be referred to as, the filter unit, a machine (not completely shown) is selected that is adapted to wind a single short single tube element such as that shown at, either B or B'. The machine is provided with an elongated rotatable winding spindle 20 for receiving either a single core, or one made up in sections, or shown at 10, 11 and 12. The spindle 20 may be of any convenient length, that is, the spindle may be made to take any multiple of short tube elements and make them into a single filter unit. The machine also is provided with a rotatable spindle 22 upon which are mounted traveling guides 24 and 26. These guides are each provided with finger, or eyes 24' and 26' through which the strands 14 and 14' are fed to the winding spindle 20. These guides 24 and 26 reciprocate back and forth along the spindle 22 for guiding the strands 14 and 14' over the surface of the core for winding a plurality of courses over the filter tube elements which is being fed from conveniently placed rolls 30 and 30'. These two cams 20 and 22 are rotated at the proper speeds to wind the strands in spaced relationship as shown in FIGURE 4. The cam 22 is divided into two independent sections, as shown at 22' and 22''. However, any convenient number of sections may be used along which guides 24 and 26 may reciprocate. The machine may be set up and operated to wind only one tube element, if that is the type of winding called for.

The machine is also provided with means for extending the fibers 16 over the surface of the tube as it is being wound. This means comprises a stationary bar 32 (see FIG. 1) having a plurality of brushes 34 extending along the side of the bar adjacent the tube. These brushes are adapted to be in contact with the wrapped strands 14 and 14'. The bar is kept at the proper distance from the surface of the tube as the tube increases in diameter by any conventional means, diagrammatically illustrated by the member 31. These brushes brush the fibers 16 over the openings between the spaced wrappings as shown diagrammatically in FIGURE 6. As the fibers 16 are brushed over the surface of the tube, they flare out in the form of a cone and when the wrappings are adjacent the ends of the tube elements, they extend beyond the end where they are intermingled with the fibers of the abutted end of the companion fiber element and tied down by the strands of the wrappings of the opposite tube element.

The fibers of these two tube elements are, in fact, so interwoven that they will, with gentle handling remain together without the rigid core, however this is only for experimental purposes, as the finished product always carried the rigid core.

With this type of construction any reasonable length filter unit may be manufactured for whatever capacity the filter element must have. In some instances a long narrow filter element is more convenient and more easily handled than those of a larger diameter, which makes them more preferable in certain filtering operations.

Also, in the manufacture of these extended filter units, the parts may be more easily standardized when made of standard parts used for the manufacture of short length tubes, in that, the same length core used for the shorter lengths, by placing one rigid piece through the area where the tubes are abutted and abutting the core pieces elsewhere along the tube.

While the invention has been shown in a specific form, it is not intended as a limitation and the scope of the invention is best defined in the appended claim.

We claim:

A single helically wound filter unit, comprising in combination:

(a) an elongated rigid perforated tubular core;
(b) at least two filter tubular elements independently helically wound from fiber strands on said core, the helical windings of each of said strands being spaced apart to form channels extending through the filter tube element perpendicular to the core, said strands having independent fibers extending radially outwardly from the surface thereof and extending axially and circumferentially of the filter elements over the said channels with each layer of winding and outwardly beyond the ends of the said filter tube elements;
(c) at least one of the ends of each of the filter tube elements being in abutted relationship with an end of an adjacent filter tube element, the ends of the fibers extending beyond the ends of each of the abutting filter tube elements being engaged and secured by the windings on the adjacent filter tube element to form a filtering area between the abutted ends thereof.

References Cited

UNITED STATES PATENTS

| | | | |
|---|---|---|---|
| 1,685,390 | 9/1928 | Abbott | 242—35.5 |
| 1,958,268 | 5/1934 | Goldman | 210—457 |
| 2,368,216 | 1/1945 | Hastings et al. | 242—166 |

REUBEN FRIEDMAN, *Primary Examiner.*

F. MEDLEY, *Assistant Examiner.*